United States Patent [19]

Osaka et al.

[11] Patent Number: 5,132,045

[45] Date of Patent: Jul. 21, 1992

[54] ACRYLIC PHOSPHOR PASTE COMPOSITIONS AND PHOSPHOR COATINGS OBTAINED THEREFROM

[75] Inventors: Norihisa Osaka, Tajimi; Yukihiro Ikegami, Nagoya, both of Japan

[73] Assignee: Mitsubishi Rayon Co., Ltd., Tokyo, Japan

[21] Appl. No.: 323,794

[22] Filed: Mar. 15, 1989

[30] Foreign Application Priority Data

Mar. 16, 1988 [JP] Japan ............... 63-62284
Mar. 17, 1988 [JP] Japan ............... 63-64390

[51] Int. Cl.$^5$ ............................... C09K 11/02
[52] U.S. Cl. ..................... 252/301.36; 252/301.35; 427/64; 427/68
[58] Field of Search ............ 252/301.33, 301.34, 252/301.35, 301.36; 427/68, 64

[56] References Cited

U.S. PATENT DOCUMENTS

| | | | |
|---|---|---|---|
| 3,459,672 | 8/1969 | Greer ............... | 252/301.36 |
| 3,744,877 | 7/1973 | Stamm ............... | 350/354 |
| 3,839,068 | 10/1974 | Miura ............... | 427/68 |
| 3,886,394 | 5/1975 | Lipp ............... | 313/470 |
| 4,049,845 | 9/1977 | Lozier et al. ......... | 427/68 |
| 4,079,258 | 3/1978 | Franz ............... | 252/301.4 H |
| 4,142,987 | 3/1979 | Zwanenburg ......... | 252/301.36 |
| 4,188,449 | 2/1980 | Lu ............... | 427/35 |
| 4,206,250 | 6/1980 | Oba ............... | 427/64 |
| 4,382,979 | 5/1983 | Tanaka ............... | 427/68 |
| 4,443,380 | 4/1984 | Yamazoe ............... | 252/301.16 |
| 4,572,803 | 2/1986 | Yamazoe ............... | 252/301.16 |
| 5,076,963 | 12/1991 | Kameyama ............... | 252/301.36 |

FOREIGN PATENT DOCUMENTS 0076184 11/1978 Japan .
0125984 11/1978 Japan .
1064784 4/1986 Japan .
3135480 6/1988 Japan .

OTHER PUBLICATIONS

Japanese Patent Office, File Supplier Japs, Tokyo, JP; and JP-A-61 066 335 (Sony).
Japanese Patent Office, File Supplier Japs, Tokyo, JP; & JP-A-55 093 631 (Matsushita).
Sheflan, Jacobs, *The Handbook of Solvents*, 1953, pp. 398 & 399.

*Primary Examiner*—Prince Willis, Jr.
*Assistant Examiner*—Thomas Steinberg
*Attorney, Agent, or Firm*—Oblon, Spivak, McClelland, Maier & Neustadt

[57] ABSTRACT

A phosphor paste composition is disclosed, which uses as an organic binder an acrylic polymer obtained by copolymerizing an alkyl methacrylate as a principal component with a specific amount of at least one monomer selected from unsaturated carboxylic acids and hydroxyalkyl (meth)acrylates. Also disclosed is a phosphor paste composition making use of a phosphor having a volume average particle size in a range of 1-7 μm, with particles having a particle size of 1-9 μm accounting for at least 60 wt. %. These phosphor paste compositions have excellent firing characteristics and provide phosphor coatings excellent in both light-emitting characteristics and resolution.

7 Claims, No Drawings they all require a high firing temperature and without exception also leave carbon as a residue. The physical properties of a phosphor coating formed from such a phosphor paste are thus poor, in particular, the lifetime of the resultant CRT is short. In addition, black spots are formed on the surface of the phosphor coating when the CRT is rendered luminous, so that the resolution of the CRT is lowered and the picture quality is deteriorated. In particular, the use of a resin of natural origin, e.g., cellulose as a binder, tends to result in the mixing of unexpected ionic impurities which may impair the characteristics of the phosphor or in the remaining of impurities which may deteriorate the burning-away property, since it is difficult to purify such a resin. It is therefore impossible to form a phosphor coating of high resolution from a phosphor paste which contains such a resin as a binder. As phosphor pastes said to have improved this problem, phosphor pastes making use of a synthetic resin of good burning-away property, for example, an alkyd resin or phenol resin have been proposed. These resins are however oil-soluble and have insufficient compatibility with a phosphor which is basically hydrophilic, whereby the dispersion of the phosphor would be poor in pastes to be formed. In other words, a coating formed by the printing process from such a phosphor paste is barely imparted with high resolution because it contains pinholes, the coating has poor levelling, and the phosphor is not coated evenly, therefore the uniform light-emitting property is poor.

ACRYLIC PHOSPHOR PASTE COMPOSITIONS AND PHOSPHOR COATINGS OBTAINED THEREFROM

BACKGROUND OF THE INVENTION

1. Field of the Invention

This invention relates to phosphor pastes for printing capable of providing a uniform and high-resolution phosphor coating which is required for the formation of a fluorescent screen of a cathode ray tube (hereinafter abbreviated as "CRT").

2. Description of the Prior Art

A CRT typified by a TV Braun tube is a display device in which electron beams emitted from an electron gun are projected on a phosphor coating to excite the phosphor to produce luminous spots in the form of a pattern. A variety of visual equipment making use of a high electronic technique has been developed. Their display devices range from color display devices to monochrome display devices. These display devices also vary widely in size from large to very small. It is the phosphor coating formed on a glass plate of a CRT that governs the performance of the CRT which makes up the heart of such visual equipment. As production processes for the phosphor coating, there have been known, for example, slurry processes, settling processes, electrophoretic deposition processes and vacuum evaporation processes for a monochrome CRT. Among these, the settling process making use of a phosphor, and an inorganic binder is generally used to form a phosphor coating for a high-resolution monitor CRT. However, the surface of the phosphor coating obtained by this process is excessively rough. This process can therefore hardly provide a phosphor coating of uniform thickness and high resolution. On the other hand, the phosphor coating of a color CRT contains three phosphors of red, green and blue colors arranged in the form of dots or stripes. Photo-curing processes using a shadow mask have conventionally been used for its formation. Use of a shadow mask with a fine pattern formed therein is however indispensable for the formation of the fluorescent screen of a color CRT by this process. A shadow mask of higher accuracy is required as the CRT becomes smaller in size or a CRT having a screen of higher resolution is desired. In addition, it is also necessary to develop a high-performance phosphor slurry usable for the formation of such a phosphor coating. The formation of a fluorescent screen by the photo-curing process using a shadow mask is accompanied by problems in that there is a higher initial cost, time- and labor-consuming recovery of extra phosphor resulting in the course of formation of the fluorescent screen is necessary and the phosphor is substantially lost. Accordingly, a printing process has recently been developed for the formation of a phosphor coating having a uniform thickness and little roughness on the surface of the phosphor coating and hence suited for a high-resolution CRT. According to this process, a CRT panel (front glass plate) is printed either directly or indirectly with a paste composed of a phosphor, an organic resin binder and a solvent and the binder resin component in the paste is thereafter burnt away to form a fluorescent screen. This process is industrially advantageous, because compared to the conventional processes for the formation of a phosphor coating the initial cost is lower, the loss of the phosphor is smaller and the material cost can hence be reduced, and the productivity is higher.

As known phosphor pastes usable for this process, reference may be made to Japanese Patent Publication No. 23231/1986 and Japanese Patent Laid-Open No. 213778/1984.

As resins useful in these phosphor pastes, there are cellulose resins and vinyl alcohol resins. They however Developed as phosphor pastes free of these inconvenience are those added with a compound which contain highly-ionic functional groups having compatibility with the phosphor, for example, phosphoric groups or nitrogen-containing functional groups. These phosphor pastes however have poor firing characteristics, thereby making it difficult to obtain from them a phosphor coating of high resolution and good picture quality.

For the production of color fluorescent screens, it is necessary to print a phosphor in a pattern such as stripes or dots. It is however difficult to print such a pattern in a desired size and with good accuracy whichever conventional phosphor paste is used. The primary reasons for this problem are that the phosphor pastes have insufficient thixotropy and the stripe or dot pattern once formed is allowed to flow to result in deformation.

SUMMARY OF THE INVENTION

The present inventors conducted research with a view to developing a phosphor paste free of the inconvenience described above. As a result, it has been found that the object can be achieved by improving the characteristics of particles of a phosphor pigment, which forms the phosphor paste, and by using a binder resin having excellent compatibility with the phosphor pigment and superb burning-away property. The above finding has led to the completion of this invention.

An object of this invention is therefore to provide a phosphor paste composition having excellent firing characteristics and suitable for use in the formation of a phosphor coating for a CRT, said coating being excellent in resolution and light-emitting characteristics.

Another object of this invention is to provide a phosphor coating for a high-resolution CRT, said coating having little roughness, being substantially free of pinholes and excellent in light-emitting characteristics.

In one aspect of this invention, there is thus provided a phosphor paste composition comprising:

(A) 100 parts by weight of an acrylic polymer obtained by copolymerizing (a) 52-99.9 wt. % of an alkyl methacrylate, (b) at least 0.1 wt. % of at least one monomer selected from unsaturated carboxylic acids and hydroxyalkyl (meth)acrylates with the proviso that the total proportion of the one or more unsaturated carboxylic acids is not greater than 8 wt. % and that the total proportion of the one or more hydroxylalkyl (meth)acrylates if contained is not greater than 40 wt. %, and (c) 0–20 wt. % of another vinyl monomer copolymerizable with the above monomers;

(B) 250-2,000 parts by weight of a phosphor; and (C) a solvent;

said composition having a viscosity of 5,000–200,000 cps at 25° C.

In another aspect of this invention, there is also provided a phosphor paste composition comprising a phosphor with a layer of an activator, said phosphor having a volume average particle size in a range of 1–7 μm with particles having a particle size of 1–9 μm accounting for at least 60 wt. %, an organic resin binder and an organic solvent, said composition having a viscosity of 5,000–200,000 cps at 25° C.

In a further aspect of this invention, there is also provided a phosphor coating formed by printing a pattern with a phosphor paste composition containing a phosphor pigment with a layer of an activator, said phosphor having a volume average particle size in a range of 1–7 μm, with particles having a particle size of 1–9 μm accounting for at least 60 wt. %, and then firing the phosphor paste composition.

DETAILED DESCRIPTION OF THE PREFERRED EMBODIMENTS

An acrylic polymer is preferred as the organic resin binder for the phosphor paste composition according to this invention, although a conventionally-known resin such as an alkyd resin, ethylcellulose or phenol resin can also be used. As a particularly preferable acrylic polymer, may be mentioned an acrylic polymer (A) obtained by copolymerizing (a) 52-99.9 wt. % of an alkyl methacrylate, (b) at least 0.1 wt. % of at least one monomer selected from unsaturated carboxylic acids and hydroxyalkyl (meth)acrylates with the proviso that the total proportion of the one or more unsaturated carboxylic acids if contained is not greater than 8 wt. % and that the total proportion of the one or more hydroxylalkyl (meth)acrylates if contained is not greater than 40 wt. %, and (c) 0-20 wt. % of another vinyl monomer copolymerizable with the above monomer. It is essential that 52-99.9 wt. % of the alkyl methacrylate be copolymerized in the acrylic polymer (A). If the proportion of the alkyl methacrylate is smaller than 52 wt. %, the acrylic polymer (A) has insufficient burning-away property. On the other hand, proportions greater than 99.9 wt. % lead to an acrylic polymer having insufficient compatibility with the phosphor, thereby failing to provide any phosphor paste consistent with the objects of this invention. Specific examples of the alkyl methacrylate include $C_{1-8}$-alkyl methacrylates such as methyl methacrylate, ethyl methacrylate, n-butyl methacrylate and isobutyl methacrylate. One or more of these monomers may be chosen as desired in view of their firing conditions such as burning starting temperatures, complete burning-away temperatures, volume reducing rates upon firing, and the desired degree of improvement to the thixotropy of a phosphor paste containing the acrylic polymer. However, it is particularly preferred to use ethyl methacrylate or isobutyl methacrylate as the principal alkyl methacrylate.

It is necessary for the acrylic polymer (A) used in this invention that at least one compound selected from unsaturated carboxylic acids and hydroxylalkyl (meth)acrylates be copolymerized in a proportion of at least 0.1 wt. %. An acrylic polymer containing at least 0.1 wt. % of such polar-group-containing monomer units has extremely good compatibility with a phosphor, thereby making it possible to prepare a paste in which the phosphor is stably dispersed.

To obtain the acrylic polymer (A), one or more unsaturated carboxylic acids are preferably copolymerized up to 8 wt. % in total. If an acrylic polymer obtained by copolymerizing one or more unsaturated carboxylic acids in a total proportion greater than 8 wt. % is used as a binder resin to prepare a paste, the phosphor is prone to aggregation in the paste, and the burning-away property of the acrylic polymer tends to deteriorate. It is hence not preferable to use one or more unsaturated carboxylic acids in such a large total proportion. The preferable total proportion of one or more unsaturated carboxylic acids to be copolymerized is at least 0.1 wt. %, more preferably 0.3-5 wt. %. As specific examples of the unsaturated carboxylic acids, may be mentioned acrylic acid, methacrylic acid, itaconic acid, phthalic acid and maleic acid.

To obtain the acrylic polymer (A), one or more hydroxyalkyl (meth)acrylates are preferably copolymerized up to 40 wt. % in total. An acrylic polymer obtained by copolymerizing one or more hydroxyalkyl (meth)acrylates in a total proportion greater than 40 wt. % has deteriorated burning-away property and is hence not preferred. As preferable specific examples of the hydroxyalkyl (meth)acrylates, may be mentioned those containing an alkyl group having 1-4 carbon atoms such as hydroxyethyl (meth)acrylates, hydroxypropyl (meth)acrylates and hydroxybutyl (meth)acrylates.

It is necessary for the acrylic copolymer (A) employed in this invention that at least one of unsaturated carboxylic acids and hydroxyalkyl (meth)acrylates be copolymerized in a proportion of at least 0.1 wt. %, preferably at least 0.3 wt. %. An acrylic polymer in which the copolymerized proportion of at least one of these components is smaller than 0.1 wt. % has insufficient compatibility with the phosphor. Use of such an acrylic polymer results in failure to provide a phosphor paste having properties intended to be obtained in this invention.

In the acrylic polymer (A) useful in the practice of this invention, it is also possible to copolymerize not more than 20 wt. % of another vinyl monomer copolymerizable with the monomers described above. Specific examples of the copolymerizable vinyl monomer include alkyl acrylates such as ethyl acrylate, propyl acrylate and butyl acrylate as well as vinyl acetate, vinyl ethoxyacetate, vinyl propionate, methyl vinyl ether, ethyl vinyl ether, isopropyl vinyl ether, n-propyl vinyl ether, methyl vinyl ketone, ethyl vinyl ketone, n-propyl vinyl ketone, isopropyl vinyl ketone, γ- methaoryloxypropyltrimethoxysilane, γ-methacryloxypropyltris(β-methoxyethoxy)silane, methacryloxymethyltrimethoxysilane, 3-methacryloxypropylmethyldimethoxysilane, styrene, o-methylstyrene, m-methylstyrene, p-methylstyrene, o-vinylbenzoic acid, p-vinylbenzoic acid, 2,4-dimethylstyrene, 3,4-dimethylstyrene and 3,5-dimethylstyrene. They may be used either singly or in combination to the extent of not causing any problem with respect to the burning-away property of the acrylic polymer.

It is also possible to copolymerize a further polyfunctional crosslinkable monomer, e.g., divinylbenzene or ethylene glycol di(meth)acrylate, to the extent of not impairing the burning-away property of the acrylic polymer.

In the present invention, the phosphor is added in a proportion of 250–2,000 parts by weight per 100 parts by weight of the acrylic polymer (A). Proportion of the phosphor smaller than 250 parts by weight per 100 parts by weight of the acrylic polymer (A) are too small to provide a phosphor coating having uniform light-emitting characteristics. On the other hand, a phosphor paste containing the phosphor in a proportion greater than 2,000 parts by weight can form only a phosphor coating having low levelling property. When this phosphor paste is applied by the screen printing process, the resulting coating contains pinholes or surface roughness, thereby failing to provide a phosphor coating having uniform light-emitting characteristics.

Preferably, the phosphor paste composition according to this invention has a viscosity of about 5,000–200,000 cps at 25° C. It is thus preferable to add an organic solvent having a boiling point of at least 150° C. to the phosphor paste. If an organic solvent to be added to the phosphor paste has a boiling point lower than 150° C., the viscosity of the resulting phosphor paste composition varies upon printing, thereby failing to form a phosphor coating having uniform light-emitting characteristics.

Specific examples of the solvent include diethylene glycol monoethyl ether acetate, diethylene glycol monobutyl ether acetate, 2,2,4-trimethyl-1,3-pentadiol monoisobutyrate, isophorone and 3-methoxybutyl acetate.

A coating formed from a phosphor paste whose viscosity is lower than 5,000 cps tends to develop bleeding or the like at the edges, so that the reproducibility of a stripe or dot pattern is inferior. On the other hand, a phosphor paste whose viscosity is higher than 200,000 cps has insufficient coatability. A coating formed from such a phosphor paste thus has surface roughness, thereby failing to exhibit uniform light-emitting characteristics.

In addition, the phosphor paste composition of this invention may also be added with various additives such as conventional plasticizers, dispersion stabilizers, levelling agents and thixotropic agents, as long as their proportions are limited within the ranges of not impairing the properties of the phosphor paste composition.

Preferably, the phosphor employed in this invention is almost wholly surface-coated with an activator and has a volume average particle size in a range of 1–7 μm, with particles having a particle size of 1–9 μm accounting for at least 60 wt. %. A phosphor containing particles which have some surface areas not coated with the activator is not preferable, because the light-emitting characteristics are deteriorated.

Phosphor particles employed for the formation of a phosphor screen of a monochrome cathode ray tube preferably have a volume average particle size of 1–4 μm. It is difficult to produce a phosphor having a volume average particle size smaller than 1 μm. Such a fine phosphor is expensive and, when mixed with a binder and a solvent into a phosphor paste, the phosphor particles aggregate again in the phosphor paste. It is therefore difficult to form, from this phosphor paste, a phosphor coating having high luminance and uniform light-emitting characteristics. To avoid formation of pinholes in a phosphor coating for a monochrome CRT and to impart good surface smoothness to the coating so that the coating may have good characteristics, it is preferable to control the volume average particle size to 1–4 μm.

In a monochrome phosphor, the content of particles having a particle size of 1–6 μm are at least 60 wt. %, preferably at least 80 wt. %. If the content of phosphor particles having a particle size of 1–6 μm is lower than 60 wt. % in a phosphor pigment, the resulting phosphor paste can only form a phosphor coating containing pinholes and having insufficient smoothness or a phosphor coating with phosphor particles aggregated as granules, thereby making it difficult to provide a phosphor coating having uniform light-emitting characteristics.

Phosphor particles employed for the formation of a phosphor screen of a color cathode ray tube preferably have a volume average particle size of 2–7 μm. It is difficult to produce a color phosphor having a volume average particle size smaller than 2 μm. Such a fine color phosphor is susceptible to a reduction in luminous efficiency so that its lifetime is short. Further, the luminous efficiency of the phosphor of each of the red, green and blue colors varies depending on the particle size. As the particle size becomes smaller, the differences in luminous efficiency among phosphor particles become greater, thereby failing to provide a color phosphor coating having uniform light-emitting characteristics. On the other hand, a phosphor paste making use of phosphor particles whose volume average particle size is greater than 7 μm has difficulty in forming a fluorescent screen of good pattern accuracy by the printing process. In addition, the resulting coating has a rough surface. In a mixture of color phosphor particles, the proportion of phosphor particles having a particle size of 1–9 μm should account for at least 60%, preferably at least 80%. A CRT coating formed from color phosphor particles whose particle size distribution is broader than that described above is not preferable because of pinholes, insufficient smoothness and/or aggregated phosphor particles (i.e., granules).

No particular limitations are imposed on the phosphor and activator to be used in this invention. A suitable phosphor and activator can be chosen from those well known in the art, as desired depending on the end use, for example, whether the end use is for a monochrome CRT or for a color CRT.

This invention will hereinafter be described in detail by the following examples, in which all designations of "part or parts" and "%" indicate part or parts by weight and wt. %,respectively.

EXMAPLE 1

In 180 parts of diethylene glycol monoethyl ether acetate, 98 parts of ethyl methacrylate (EMA), 2 parts of methacrylic acid (MAA) and 2.0 parts of azobisisobutyronitrile were reacted at 80° C. for 10 hours. The solid content of the reaction mixture was 35%. An acrylic polymer thus obtained had a volume average molecular weight of 170,000. Dispersed in 100 solid parts of the thus-obtained acrylic polymer were 344.8 parts of fine monochrome phosphor powder "P-45", which was yttrium oxysulfide ($Y_2O_2S$) coated with terbium as an activator, having a volume average particle size of 3.0 μm and containing 5% of phosphor particles greater than 6μm. The resultant mixture was kneaded and its viscosity was adjusted with diethylene glycol monoethyl ether acetate to 15,000 cps as measured at 25° C. by an EHD-type viscometer manufactured by Tokyo Keiki Co., Ltd., thereby obtaining a phosphor paste composition.

The composition obtained as described above was then coated to a thickness of 20 μm on a glass plate by the screen printing process, followed by drying and firing. The surface of a phosphor coating thus obtained was investigated. The state of the surface of the phosphor coating was evaluated by an optical microscope of 50–400 magnifications, using both transmitted light and reflected light. As a result, the surface of the resultant phosphor coating was found to contain no pinholes, to have high covering power and to present a smooth surface.

EXAMPLES 2 AND 3 & COMPARATIVE EXAMPLES 1 AND 2

Phosphor paste compositions were separately prepared in a similar manner as in Example 1 except that acrylic polymers were produced by changing the proportions of the monomer components as shown in Table 1. The results are also shown in Table 1.

TABLE 1

| | Monomer component | | Evaluated property | | |
|---|---|---|---|---|---|
| | EMA (%) | MAA (%) | Pinholes in coating | Smoothness | Firing characteristics |
| Ex. 1 | 98 | 2.0 | ⊚ | ⊚ | ○ |
| Ex. 2 | 99.5 | 0.5 | ⊚ | ○ | ○ |
| Ex. 3 | 95 | 5.0 | ⊚ | ⊚ | ○ |
| Comp. Ex. 1 | 100 | 0 | X | X | ○ |
| Comp. Ex. 2 | 90 | 10 | X | X | △ |

The evaluation was conducted in accordance with the following standards.

Pinholes in coating

Each phosphor paste composition was printed, dried and fired. The surface of a phosphor coating thus formed was investigated by the optical microscope of 50–400 magnifications, using transmitted light, whereby it was determined whether the surface contained pinholes or not.

⊚: No pinhole was observed at all.
○: Substantially no pinholes were observed.
△: Some pinholes were observed.
X: Relatively many pinholes were observed.

Smoothness

Each phosphor paste composition was printed, dried and fired. The surface of a phosphor coating thus formed was evaluated by the optical microscope of 50–400 magnifications, using reflected light.

⊚: Very little roughness without any trace of the screen mesh.
○: Only small roughness without any trace of the screen mesh.
△: Fairly large roughness.
X: Very large roughness with trace of the screen mesh.

Firing characteristics
Heating rate: 15° C./min.
Sample quantity: 10 mg.
Firing temperature range: from room temperature to 400° C.
○: No residue.
X: Residue was left over.

As is apparent from the above results, the phosphor coating contained pinholes and had poor smoothness in Comparative Example 1 in which methacrylic acid was not included at all. It is also appreciated from Comparative Example 2 that the use of methacrylic acid in a proportion as much as 10% led not only to the formation of pinholes in the coating and the reduced smoothness but also to the reduced firing characteristics.

EXAMPLES 4-6 & COMPARATIVE EXAMPLE 3 AND 4

Phosphor paste compositions were separately prepared by changing, as shown in Table 2, the proportions of an acrylic polymer, which had been obtained in a similar manner as in Example 1 except for the use of isobutyl methacrylate instead of EMA, and a phosphor of the same kind as that employed in Example 1. The state of each printed coating was evaluated in a similar manner as in Example 1.

TABLE 2

| | Paste composition (parts) | | Pinholes in coating | smoothness | Firing characteristics |
|---|---|---|---|---|---|
| | Acrylic polymer (A) (solids) | Phosphor | | | |
| Comp. Ex. 3 | 100 | 200 | X | ○ | ○ |
| Ex. 4 | 100 | 280 | △-○ | ○ | ○ |
| Ex. 5 | 100 | 340 | ⊚ | ⊚ | ○ |
| Ex. 6 | 100 | 1250 | △-○ | △-○ | ○ |
| Comp. Ex. 4 | 100 | 2500 | X | X | ○ |

EXAMPLES 7-9 & COMPARATIVE EXAMPLES 5 AND 6

Printed coatings were obtained respectively by changing the viscosity of a phosphor paste composition as shown in Table 3, which were obtained in a similar manner as in Example 1 except that 99.5 parts of isobutyl methacrylate, 0.5 part of MAA and diethylene glycol monobutyl ether acetate were used instead of 98 parts of EMA, 2 parts of MAA and diethylene glycol monoethyl ether acetate. The state of each of the printed coatings was then evaluated in a similar manner as in Example 1.

TABLE 3

| | Viscosity of paste (cps) | Pinholes in coating | Smoothness | Bleeding* of coating |
|---|---|---|---|---|
| Comp. Ex. 5 | 3000 | X | ◯ | X |
| Ex. 7 | 7500 | ◯ -Δ | ◉ | Δ- ◯ |
| Ex. 8 | 15000 | ◉ | ◉ | ◯ |
| Ex. 9 | 30000 | Δ | Δ | ◯ |
| Comp. Ex. 5 | 220000 | X | X | ◯ |

*Bleeding of coating: Protrusions from edges of printed coating.
X: 20 μm or greater.
Δ: Smaller than 20 μm but not smaller than 15 μm.
◯ : Smaller than 15 μm.

As is understood from Table 3, when the paste viscosity was too low as in Comparative Example 5, the surface of the resultant phosphor coating had abnormal luminance and resolution at a peripheral part thereof due to the bleeding of the coating and moreover, pinholes were formed because only portions corresponding to the binder resin were subjected to levelling. On the other hand, when the paste viscosity was too high as in Comparative Example 6, the resultant coating had poor smoothness and contained pinholes.

EXAMPLES 10 AND 11 & COMPARATIVE EXAMPLE 7

Coatings were formed separately in exactly the same manner as in Example 1 except that acrylic monomers obtained by polymerizing monomer components in the proportions shown in Table 4 were used respectively. The state of each of the coating was evaluated in a similar manner as in Example 1.

TABLE 4

| | EMA (%) | MAA (%) | Further copolymerizable vinyl monomer | Firing characteristics | Smoothness | Pinholes in coating |
|---|---|---|---|---|---|---|
| Ex. 2 | 99.5 | 0.5 | — | ◯ | ◯ | ◯ |
| Ex. 10 | 98.5 | 0.5 | γ-methacryloxypropyltrimethoxysilane (1%) | ◯ | ◯ | ◯ |
| Ex. 11 | 94.5 | 0.5 | Styrene (5%) | ◯ -Δ | ◯ | ◯ |
| Comp. Ex. 7 | 69.5 | 0.5 | Styrene (30%) | X | ◯ -Δ | ◯ |

EXAMPLE 12

In 2,2,4-trimethyl-1,3-pentadiol monoisobutyrate, 99.5 parts of isobutyl methacrylate, 0.5 part of methacrylic acid and 1.5 parts of benzoyl peroxide were reacted at 80° C. for 10 hours. An acrylic polymer thus obtained had a volume average molecular weight of 150,000. Dispersed in 100 solid parts of the thus-obtained acrylic polymer were 400 parts of fine color phosphor powder "P-22", which was composed of red phosphor powder of yttrium oxysulfide ($Y_2O_2S$) coated with europium as an activator, green phosphor powder of zinc sulfide (ZnS) coated with copper as an activator and blue phosphor powder of zinc sulfide (ZnS) coated with silver. The volume average particle size of the color phosphor powder was 4.5 μm, and phosphor particles greater than 9 μm accounted for 9% of the whole color phosphor powder. The resultant mixture was kneaded and its viscosity was adjusted with 2,2,4-trimethyl-1,3-pentadiol isobutyrate to 50,000 cps as measured at 25° C., thereby obtaining a phosphor paste composition. The composition thus obtained was then coated in the form of stripes, which had a pattern width of 150 μm and a thickness of 20 μm, on a glass plate by the screen printing process, followed by drying and firing. The surface of a phosphor coating thus obtained was investigated. The state of the surface of the phosphor coating was evaluated by the optical microscope of 50-400 magnifications to evaluate the pattern accuracy and surface state. As a result, the surface of the resultant phosphor coating was found to have a pattern accuracy of ±10 μm and to present a smooth surface having no rough area.

EXAMPLE 13

In 180 parts of diethylene glycol monoethyl ether acetate, 90 parts of isobutyl methacrylate (iBMA), 10 parts of 2-hydroxyethyl methacrylate (HEMA) and 3.0 parts of azobisisobutyronitrile were reacted at 80° C. for 10 hours. An acrylic polymer thus obtained had a weight average molecular weight of 200,000. Dispersed in 100 solid parts of the acrylic polymer were 400 parts of a color phosphor (P-22) of the same kind as that employed in Example 12. The resultant mixture was kneaded and its viscosity was adjusted with diethylene glycol monoethyl ether acetate to 30,000 cps as measured at 25° C. by the EHD-type viscometer manufactured by Tokyo Keiki Co., Ltd., thereby obtaining a phosphor paste composition.

The composition obtained as described above was then coated in the form of stripes, which had a pattern width of 150 μm and a thickness of 20 μm, on a glass plate by the screen printing process, followed by drying and firing. The surface of a phosphor coating thus obtained was evaluated. The surface of the phosphor coating was evaluated by the optical microscope of 50-400 magnifications to evaluate the pattern accuracy and surface state. As a result, the surface of the resultant phosphor coating was found to have a pattern accuracy of ±10 μm and to present a smooth surface having no rough area.

EXAMPLES 14 AND 15 & COMPARATIVE EXAMPLES 8-10

Printed coatings were formed separately in a similar manner as in Example 13 except for the use of acrylic polymers obtained in accordance with their respective monomer compositions shown in Table 5. The state of each of the printed coatings was then evaluated in a similar manner as in Example 13.

TABLE 5

| | Monomer composition | | | 150 μm pattern accuracy | Smoothness | Firing characteristics |
|---|---|---|---|---|---|---|
| | iBMA | HEMA | MAA | | | |
| Comp. Ex. 8 | 100 | 0 | 0 | Δ-X | X | ○ |
| Ex. 13 | 90 | 10 | 0 | ○ | ○ | ○ |
| Ex. 14 | 89 | 10 | 1 | ○ | ◉ | ○ |
| Ex. 15 | 65 | 35 | 0 | ○ | ◉ | ○ |
| Comp. Ex. 9 | 55 | 45 | 0 | ○ | ○ -Δ | X |
| Comp. Ex. 10 | 60 | 8 | 32 | Δ-X | X | X |

150 μm Pattern accuracy

A pattern of 150 μm wide stripes was printed through a #300 mesh screen. The widths of stripes thus coated were measured by the optical microscope of 50–400 magnifications.

○: ±10 μm.
Δ: ±20 μm.
X: ±25 μm.

As is apparent from the above results, the phosphor paste composition of Comparative Example 8 which did not contain 2-hydroxyethyl methacrylate at all gave a phosphor coating of poor smoothness and low pattern accuracy due to insufficient compatibility between the phosphor and the polymer. When the proportion of 2-hydroxyethyl methacrylate exceeded 40% or the proportion of methacrylic acid, i.e., the unsaturated carboxylic acid exceeded 20%, the resulting phosphor paste composition had poor firing characteristics. It is hence not preferable to contain them in such great proportions respectively.

EXAMPLE 16

In 185 parts of diethylene glycol monobutyl ether acetate, 88 parts of ethyl methacrylate, 12 parts of 2-hydroxyethyl methacrylate and 2.0 parts of BPO were reacted at 80° C. for 10 hours. An acrylic polymer thus obtained had a weight average molecular weight of 240,000. Dispersed in 100 solid parts of the thus-obtained acrylic polymer were 450 parts of fine monochrome phosphor powder "P-45" of the same kind as that employed in Example 1. The resultant mixture was kneaded and its viscosity was adjusted with diethylene glycol monobutyl ether acetate to 15,000 cps as measured at 25° C., thereby obtaining a phosphor paste composition. The composition obtained as described above was then coated to a thickness of 20 μm on a glass plate by the screen printing process, followed by drying and firing. The surface of a phosphor coating thus obtained was evaluated. The surface of the phosphor coating was evaluated by the optical microscope of 50–400 magnifications, using both transmitted light and reflected light. As a result, the surface of the resultant phosphor coating was found to contain no pinholes, to have high covering power and to present a smooth surface.

EXAMPLES 17–19 & COMPARATIVE EXAMPLES 11 AND 12

Phosphor paste compositions were separately prepared by changing, as shown in Table 6, the proportions of the acrylic polymer, which had been obtained in Example 13, and a phosphor of the same kind as that employed in Example 12. The state of each printed coating was evaluated.

TABLE 6

| | Paste composition (parts) | | 150 μm pattern accuracy | smoothness | Firing characteristics |
|---|---|---|---|---|---|
| | Acrylic polymer (A) (solids) | Phosphor | | | |
| Comp. Ex. 11 | 100 | 200 | X | ○ | ○ |
| Ex. 17 | 100 | 450 | ○ | ○ | ○ |
| Ex. 18 | 100 | 600 | ○ | ○ | ○ |
| Ex. 19 | 100 | 1800 | ○ | ○ -Δ | ○ |
| Comp. Ex. 12 | 100 | 2200 | Δ-X | X | ○ |

As is apparent from the above results, when the proportion of the phosphor was smaller than 250 parts per 100 solid parts of the acrylic polymer, the resulting phosphor coating had poor pattern accuracy. On the other hand, when the phosphor content exceeded 2,000 parts, the resulting phosphor coating had not only poor smoothness but also undesirable pattern accuracy.

EXAMPLE 20

In 180 parts of 2,2,4-trimethyl-1,3-pentadiol monoisobutyrate, 84 parts of isobutyl methacrylate, 14 parts of 2-hydroxyethyl methacrylate, 2 parts of methacrylic acid and 1.5 parts of kaya ester O (tert-butyl peroctoate) were reacted at 80° C. for 10 hours. An acrylic polymer thus obtained had a weight average molecular weight of 260,000 and an acid value of 4.6. Dispersed in 100 solid parts of the acrylic polymer were 380 parts of a color phosphor (P-22), which was of the same kind as that employed in Example 12, and 25 parts of fine silica powder. The resultant mixture was kneaded and the viscosity was adjusted with 2,2,4-trimethyl-1,3-pentadiol monoisobutyrate to 50,000 cps as measured at 25° C., thereby obtaining a phosphor paste composition. The phosphor paste composition obtained as described above was then coated in the form of stripes, which had a pattern width of 150 μm and a thickness of 20 μm, on a glass plate by the screen printing process, followed by drying and firing. The surface of a phosphor coating thus obtained was evaluated. The surface of the phosphor coating was evaluated by the optical microscope of 50–400 magnifications to evaluate the pattern accuracy and surface state. As a result, the surface of the resultant phosphor coating was found to have a pattern accuracy of ±10 μm and to present a smooth surface having no rough area.

EXAMPLES 21 AND 22 & COMPARATIVE EXAMPLES 13 AND 14

Printed coatings were separately formed in a similar manner as in Example 20 except that the viscosities of the corresponding pastes were adjusted as shown in Table 7 by using 2,2,4-trimethyl-1,3-pentadiol monoisobutyrate as a solvent. The state of each of the coatings was evaluated in a similar manner as in Example 20.

TABLE 7

|  | Viscosity of paste (cps) | 150 μm pattern accuracy | Smoothness | Firing characteristics |
|---|---|---|---|---|
| Comp. Ex. 13 | 4000 | × | ○ | ○ |
| Ex. 20 | 8000 | ○ -△ | ○ | ○ |
| Ex. 21 | 50000 | ⊙ | ○ | ○ |
| Ex. 22 | 80000 | ○ | ○ | ○ |
| Comp. Ex. 14 | 240000 | △-× | × | ○ |

As is clearly envisaged from the above results, the coating printed at the paste viscosity lower than 5,000 cps had insufficient pattern accuracy due to bleeding. On the other hand, the paste viscosity higher than 200,000 resulted in a coating whose surface levelling was poor, so that the surface was very rough and contained a marked trace of the screen mesh and moreover the pattern accuracy was poor.

EXAMPLES 23 AND 24

Printed coatings were separately formed in a similar manner as in Example 20 except that the proportion of fine silica powder as a thixotropic agent was changed as shown in Table 8. The state of each of the coatings was evaluated in a similar manner as in Example 20.

TABLE 8

|  | Fine silica powder (parts) | 150 μm pattern accuracy | Smoothness |
|---|---|---|---|
| Ex. 23 | 0 | ○ | ⊙ |
| Ex. 24 | 50 | ⊙ | ○-△ |

EXAMPLES 25 AND 26 & COMPARATIVE EXAMPLE 15 AND 16

Paste compositions were prepared in a similar manner as in Example 1 except for the use of phosphor having different volume average particle sizes shown in Table 9. The state of a coating formed from each of the paste compositions was evaluated in a similar manner as in Example 1. The results are also shown in Table 9.

TABLE 9

|  | Volume average particle size of phosphor (μm) | Content of particles having a particle size greater than 6 μm (%) | Pinholes in coating | Smoothness | Aggregates (granules) | Light-emitting characteristics |
|---|---|---|---|---|---|---|
| Ex. 25 | 1.5 | 4 | ○ | ○ | △ | ○ |
| Ex. 26 | 2.2 | 3 | ⊙ | ⊙ | ○ | ○ |
| Comp. Ex. 15 | 5.0 | 23 | △ | △ | ○ | ○ |
| Comp. Ex. 16 | 8.0 | 30 | × | × | ○ | ○ |

Aggregates

Each composition was printed, dried and fired. The surface of the resulting phosphor coating was evaluated by the optical microscope of 50 magnifications.

○: No phosphor aggregates of 30 μm and greater.
△: Some phosphor aggregates of 30 μm and greater.
×: Abundant phosphor aggregates of 30 μm and greater.

Light-emitting characteristics

Evaluation was made using as a standard a CRT manufactured by using the phosphor without grinding.

○: Comparable with the standard.
×: Inferior to the standard.

COMPARATIVE EXAMPLES 17-19

Printed coatings were separately obtained in a similar manner as in Example 1 except that the fine phosphor powder having a volume average particle size of 8.0 μm was ground to the particle sizes given in Table 10. The state of each of the coatings was evaluated. The results thus obtained are also shown in Table 10.

TABLE 10

|  | Volume average particle size of phosphor (μm) | Aggregates (granules) | Light-emitting characteristics | Smoothness | Pinholes in coating |
|---|---|---|---|---|---|
| Comp. Ex. 17 | 0.7 | × | × | ○ | ○ |
| Comp. Ex. 18 | 2.5 | × | × | ○ | ○ |
| Comp. Ex. 19 | 5.0 | △ | × | △-× | △ |

As is apparent from the results of Table 10, the use of the ground phosphors led to coatings of inferior light-emitting characteristics and of a state substantially equal to that available without grinding, although their particle sizes fell within the preferable range for the present invention.

EXAMPLES 27-30

Printed coatings were separately obtained in a similar manner as in Example 1 except that phosphors having the particle size distribution characteristics shown in Table 11 were used respectively. The state of each of the coatings was evaluated. The results thus obtained are also shown in Table 11.

TABLE 11

| | Particle size distribution of phosphor (content in whole phosphor, %) | | | | | Volume average particle size | Pinholes in coating | Smoothness | Aggregates (granules) | Light-emitting characteristics |
|---|---|---|---|---|---|---|---|---|---|---|
| | <1 | 1-2 | 2-4 | 4-6 | ≧6 | | | | | |
| Ex. 27 | 15 | 30 | 50 | 5 | 0 | 2.4 | ○ | ○ | △ | ○ |
| Ex. 28 | 5 | 25 | 60 | 10 | 0 | 3.2 | ◎ | ◎ | ○ | ○ |
| Ex. 29 | 1 | 19 | 75 | 5 | 0 | 3.0 | ◎ | ◎ | ○ | ○ |
| Ex. 30 | 5 | 15 | 30 | 35 | 15 | 3.8 | ○ -△ | ○ -△ | ○ | ○ |

EXAMPLES 31 AND 32 & COMPARATIVE EXAMPLES 20 AND 21

Printed coatings were separately obtained in a similar manner as in Example 12 except that phosphors having the particle size characteristics shown in Table 12 were used respectively. The state of each of the coatings was evaluated. The results thus obtained are also shown in Table 12.

EXAMPLES 33-36

Printed coatings were separately obtained in a similar manner as in Example 12 except that phosphors having the particle size distribution characteristics shown in Table 14 were used respectively. The state of each of the coatings was evaluated. The results thus obtained are also shown in Table 14.

TABLE 14

| | Particle size distribution of phosphor (content in whole phosphor, %) | | | | | | Volume average particle size (μm) | Pinholes in coating | Smoothness | Aggregates (granules) | Light-emitting characteristics | 150 μm pattern accuracy |
|---|---|---|---|---|---|---|---|---|---|---|---|---|
| | <1 μm | 1-3 | 3-5 | 5-7 | 7-9 | ≧9 | | | | | | |
| Ex. 33 | 2 | 25 | 58 | 13 | 2 | 0 | 3.5 | ○ | ○ | △ | ○ | ○ |
| Ex. 34 | 0 | 20 | 63 | 14 | 3 | 0 | 4.2 | ◎ | ◎ | ○ | ○ | ○ |
| Ex. 35 | 0 | 22 | 71 | 7 | 0 | 0 | 4.5 | ◎ | ◎ | ○ | ○ | ○ |
| Ex. 36 | 1 | 10 | 40 | 30 | 17 | 2 | 5.5 | ○ -△ | ○ -△ | ○ | ○ | ○ |

TABLE 12

| | Volume average particle size of phosphor (μm) | Content of particles having a particle size greater than 9 μm in phosphor (%) | Pinholes in coating | Smoothness | Aggregates (granules) | Light-emitting characteristics | 150 μm pattern accuracy |
|---|---|---|---|---|---|---|---|
| Ex. 31 | 3.0 | 2 | ○ | ○ | ○ | △ | ○ |
| Ex. 32 | 4.5 | 7 | ◎ | ◎ | ○ | ○ | ○ |
| Comp. Ex. 20 | 8.0 | 20 | △-X | △ | ○ | ○ | ○ |
| Comp. Ex. 21 | 10.0 | 30 | X | X | ○ | ○ | △ |

COMPARATIVE EXAMPLES 22-24

Printed coatings were separately obtained in a similar manner as in Example 12 except that fine phosphor powder having the average particle size of 7.6 μm was used after grinding it to the particle sizes shown in Table 13, respectively. The state of each of the coatings was evaluated. The results thus obtained are also shown in Table 13.

TABLE 13

| | Volume average particle size of phosphor (μm) | Aggregates (granules) | Light-emitting characteristics | Smoothness | Pinholes in coating |
|---|---|---|---|---|---|
| Comp. Ex. 22 | 1.3 | X | X | ○ | ○ |
| Comp. Ex. 23 | 3.0 | X | X | ○ | ○ |
| Comp. Ex. 24 | 4.5 | △ | X | ○ | ○ |

As is clearly envisaged from the results of Table 13, the use of the ground phosphors led to coatings of inferior light-emitting characteristics and of a state substantially equal to that available without grinding, although their particle sizes fell within the preferable range for the present invention.

The phosphor paste composition according to this invention has excellent firing characteristics. Its use makes it possible to obtain a phosphor coating having superb luminance and resolution and hence suited for a CRT. In addition, the phosphor paste composition uses a phosphor of specific particle size and particle size distribution. CRT manufactured by using the phosphor paste composition is equipped with a substantially pinhole-free phosphor coating which contains little roughness and has excellent light-emitting characteristics.

The phosphor paste composition can therefore bring about enormous effects as a phosphor paste composition for a high-resolution CRT.

What is claimed is:
1. A phosphor paste composition comprising:
(A) 100 parts by weight of an acrylic polymer obtained by copolymerizing (a) 52-99.9 wt. % of an alkyl methacrylate, (b) at least 0.1 wt. % of at least one monomer selected from unsaturated carboxylic acids and hydroxyalkyl (meth)acrylates with the proviso that the total proportion of the one or more unsaturated carboxylic acids is not greater than 8 wt. % and that the total proportion of the one or more hydroxylalkyl (meth)acrylates is not greater than 40 wt. %, and (c) 0-20 wt. % of another vinyl monomer copolymerizable with the above monomers;

(B) 250-2,000 parts by weight of a phosphor; and (C) an organic solvent having a boiling point of at least 150° C.;

said composition having a viscosity of 5,000-200,000 cps at 25° C.

2. The phosphor paste composition of claim 1, wherein said phosphor is a phosphor with a layer of an activator and said phosphor has a volume average particle size in a range of 1-7 μm, with particles having a particle size of 1-9 μm accounting for at least 60 weight %.

3. The phosphor paste composition as claimed in claim 2, wherein the phosphor is a monochrome phosphor having a volume average particle size of 1-4 μm.

4. The phosphor paste composition as claimed in claim 2, wherein the phosphor is a color phosphor having a volume average particle size of 2-7 μm.

5. A phosphor coating formed by printing a pattern with a phosphor paste composition, comprising:

(A) 100 parts by weight of an acrylic polymer obtained by copolymerizing (a) 52-99.9 wt. % of an alkyl methacrylate, (b) at least 0.1 wt. % of at least one monomer selected from unsaturated carboxylic acids and hydroxyalkyl (meth)acrylates with the proviso that the total proportion of the one or more unsaturated carboxylic acids is not greater than 8 wt. % and that the total proportion of the one or more hydroxylalkyl (meth)acrylates is not greater than 40 wt. %, and (c) 0-20 wt. % of another vinyl monomer copolymerizable with the above monomers;

(B) 250-2,000 parts by weight of a phosphor; and (C) an organic solvent having a boiling point of at least 150° C.;

said composition having a viscosity of 5,000-200,000 cps at 25° C., and then firing the phosphor paste composition.

6. The phosphor coating as claimed in claim 5, wherein the phosphor is a monochrome phosphor having a volume average particle size of 1-4 μm.

7. The phosphor coating as claimed in claim 5, wherein the phosphor is a color phosphor having a volume average particle size of 2-7 μm.

* * * * *